United States Patent
Popescu et al.

(10) Patent No.: US 12,294,898 B2
(45) Date of Patent: May 6, 2025

(54) WIRELESS DEVICE, FIRST AND SECOND RADIO NETWORK NODES, AND METHODS PERFORMED THEREIN FOR DETERMINING GLOBAL ID OF THE SECOND RADIO NETWORK NODE

(71) Applicant: Telefonaktiebolaget LM Ericsson (publ), Stockholm (SE)

(72) Inventors: Maximilian Popescu, Skärblacka (SE); Pär Gustavsson, Linköping (SE); Thomas Walldeen, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 695 days.

(21) Appl. No.: 17/290,282

(22) PCT Filed: Oct. 30, 2019

(86) PCT No.: PCT/SE2019/051089
§ 371 (c)(1),
(2) Date: Apr. 30, 2021

(87) PCT Pub. No.: WO2020/091678
PCT Pub. Date: May 7, 2020

(65) Prior Publication Data
US 2021/0385701 A1    Dec. 9, 2021

Related U.S. Application Data

(60) Provisional application No. 62/753,955, filed on Nov. 1, 2018.

(51) Int. Cl.
*H04W 4/00* (2018.01)
*H04W 36/00* (2009.01)
*H04W 48/16* (2009.01)

(52) U.S. Cl.
CPC ... *H04W 36/0061* (2013.01); *H04W 36/0077* (2013.01); *H04W 48/16* (2013.01)

(58) Field of Classification Search
CPC ......... H04W 36/0061; H04W 36/0077; H04W 36/08; H04W 36/18; H04W 36/0011; H04W 36/14; H04W 48/16; H04W 80/04
(Continued)

(56) References Cited

U.S. PATENT DOCUMENTS

| 2011/0243097 | A1* | 10/2011 | Lindqvist | H04W 24/02 370/328 |
| 2014/0287748 | A1* | 9/2014 | Lee | H04W 36/0016 455/434 |
| 2017/0063671 | A1* | 3/2017 | Gandhi | H04L 45/28 |

OTHER PUBLICATIONS

3GPP, "3GPP TS 36.300 V15.3.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Sep. 2018, pp. 1-358.
(Continued)

*Primary Examiner* — Temica M Beamer
(74) *Attorney, Agent, or Firm* — Murphy, Bilak & Homiller, PLLC

(57) ABSTRACT

It is herein disclosed a wireless device, first and second radio network nodes and methods performed therein for communication. A method performed by a first radio network node for determining a global identity of a second radio network node which is a neighbour of the first radio network node is provided. The method comprises one or more of: receiving length information which specifies a length of the global ID of the second radio network node, from a wireless device which is served by the first radio network node; and determining the global ID of the second radio network node based on the length information.

5 Claims, 10 Drawing Sheets

S310 Instruct wireless device to report length information of a global ID of a second radio network node S320 Receive length information of a global ID of the second radio network node S330 Determine global ID of the second radio network node based on the received length information

(58) Field of Classification Search
USPC .......................................................... 370/331
See application file for complete search history.

(56) References Cited

OTHER PUBLICATIONS

3GPP, "3GPP TS 36.331 V15.3.0", 3rd Generation Partnership Project; Technical Specification Group Radio Access Network; Evolved Universal Terrestrial Radio Access (E-UTRA); Radio Resource Control (RRC); Protocol specification (Release 15), Sep. 2018, pp. 1-918.

3GPP, "3GPP TS 38.413 V15.1.0", 3rd Generation Partnership Project; Technical Specification Group Radio Access Network; NG-RAN; NG Application Protocol (NGAP) (Release 15), Sep. 2018, pp. 1-295.

3GPP, "3rd Generation Partnership Project; Technical Specification Group Radio Access Network; NR; Radio Resource Control (RRC) protocol specification (Release 15)", 3GPP TS 38.331 V15.3.0, Sep. 2018, pp. 1-445.

Ericsson, "Size of remaining minimum system information", 3GPP TSG-RAN WG#101, Tdoc R2-1802329, (revision of R2-1800303), Athens, Greece, Feb. 26-Mar. 2, 2018, pp. 1-10.

Huawei, et al., "CR on 38.331 for measurement configuration in NR-DC", 3GPP TSG-RAN WG2 Meeting#103bis, R2-1815404, Chengdu, China, Oct. 8-12, 2018, pp. 1-8.

Mitsubishi Electric, "Variable length gNB IDs encoding", 3GPP TSG RAN WG3 #97, R3-174075, Prague, Czech Republic, Oct. 9-13, 2017, pp. 1-3.

Qualcomm Incorporated, "On NG-RAN node identifiers", 3GPP TSG-RAN WG3 Meeting #97, R3-172730, Berlin, Germany, Aug. 21-25, 2017, pp. 1-3.

* cited by examiner

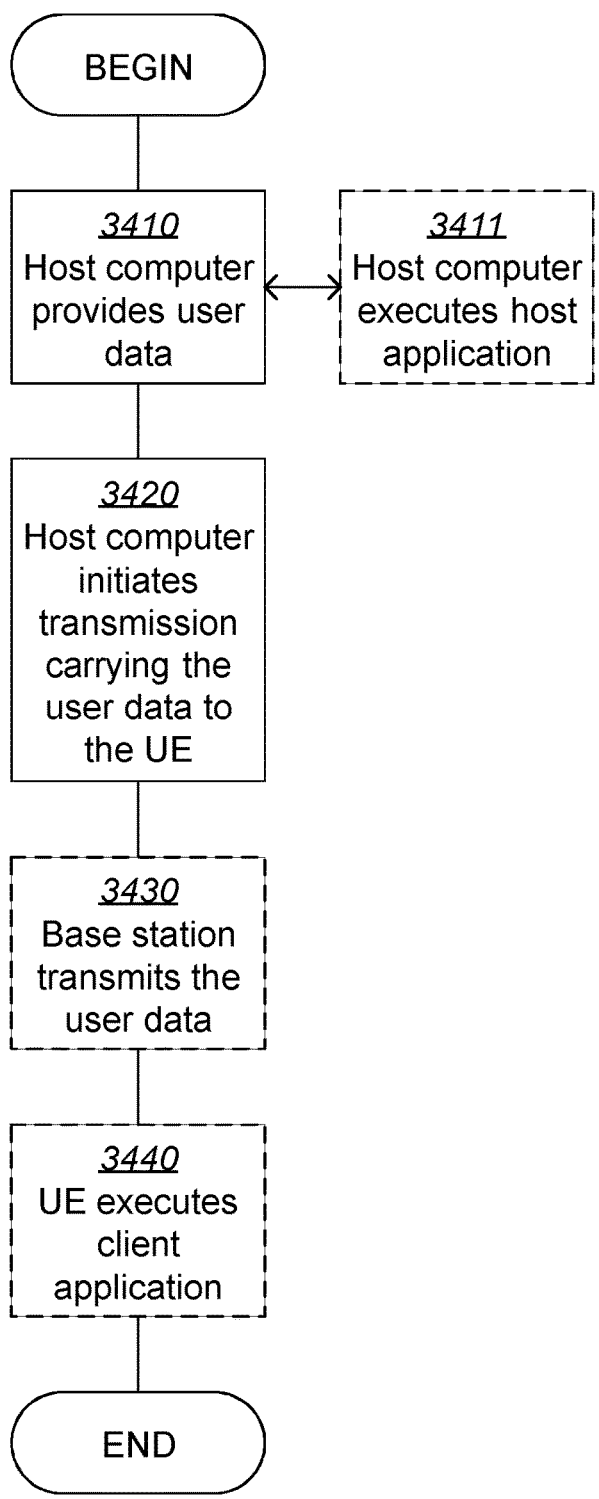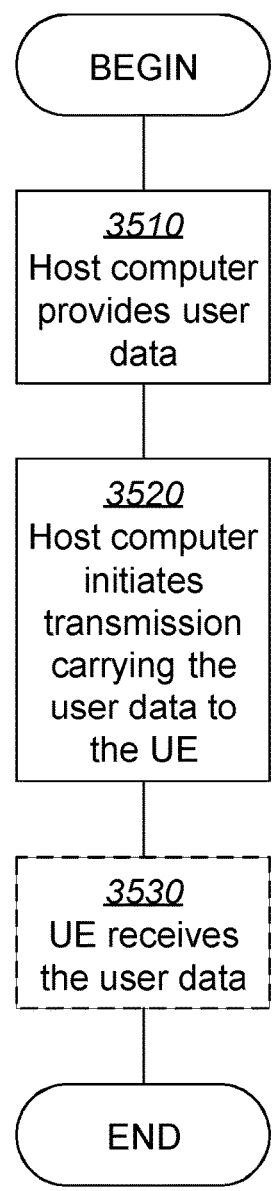
Fig. 11
Fig. 12

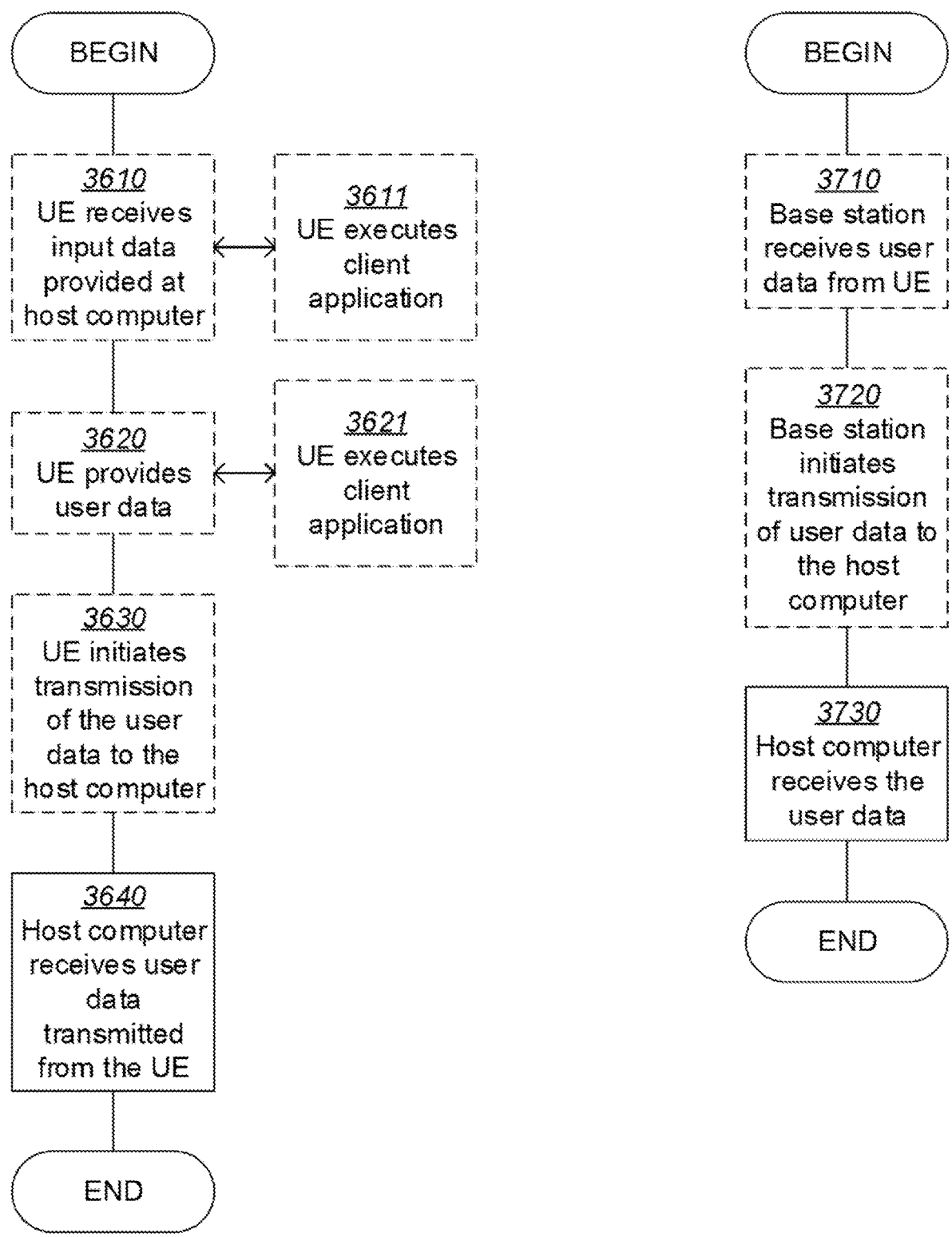

WIRELESS DEVICE, FIRST AND SECOND RADIO NETWORK NODES, AND METHODS PERFORMED THEREIN FOR DETERMINING GLOBAL ID OF THE SECOND RADIO NETWORK NODE

TECHNICAL FIELD

The present disclosure relates to a wireless device, first and second radio network nodes and methods performed therein for communication. Furthermore, a computer program product and a computer readable storage medium are also provided herein. In particular, the present disclosure relate to determining global ID of the second radio network node.

BACKGROUND

In a typical wireless communication network, wireless devices, also known as wireless communication devices, mobile stations, stations (STA) and/or user equipments (UEs), communicate via a Radio Access Network (RAN) to one or more core networks (CNs). The RAN covers a geographical area which is divided into service areas or cells, with each service area or cell being served by a radio network node such as a radio access node e.g., a Wi-Fi access point or a radio base station (RBS), which in some networks may also be denoted, for example, a NodeB (NB), evolved NodeB (eNB) or gNodeB (gNB). A service area or cell is a geographical area where radio coverage is provided by the radio network node. The radio network node communicates over an air interface operating on radio frequencies with the wireless device within range of the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for wireless devices. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more CNs.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially flat architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched Domain. New radio (NR) is a new radio access technology being standardized in 3GPP.

In a wireless communications network, the wireless device, such as uUE, mobile telephones, mobile devices, mobile terminals, etc. can communicate with other wireless device and/or remote server via a radio network node. Taking LTE system as an example, it comprises an E-UTRAN and an EPC network, or simply core network. The E-UTRAN comprises a number of radio network nodes, e.g. eNBs, for providing both user-plane, e.g. Packet Data Convergence Protocol (PDCP), Radio Link Control (RLC), Medium Access Control (MAC) and PHYsical (PHY) layers, and control-plane, e.g. Radio Resource Control (RRC), protocol terminations towards the wireless device.

In order to provide seamless connectivity for the wireless devices, the radio network nodes are configured with a list of their neighbour radio network nodes so that the wireless devices can be handed over to one of the cells operated by other radio network nodes when necessary, e.g. due to mobility of the wireless devices and/or changes in signal conditions and/or load balancing, etc. Therefore, each radio network node is required to store information relating to its neighbours comprising, inter alia, identifiers of the cells operated by each, e.g. known, neighbour radio network node, a unique identifier e.g. gNB ID, associated with each neighbour radio network node, and a respective transport network layer (TNL) address e.g. Internet Protocol (IP) address associated with each neighbour radio network node. The TNL address facilitates communication between radio network nodes via a so-called X2 interface, which is provided between each neighbour radio network node pair. The X2 interface uses the Stream Control Transmission Protocol (SCTP) to transmit data between the radio network nodes.

Each radio network node can obtain the TNL address associated with another radio network node by following a so-called TNL Address Discovery procedure specified in section 22.3.6 of 3GPP TS 36.300. In summary, whenever a particular radio network node discovers a candidate neighbour radio network node, it can request the so-called Mobility Management Entity (MME) in the core network to transfer configuration information between the two radio network nodes via an S1 interface, which is provided between each radio network node and the core network. This procedure needs to be followed whenever there is a change in the configuration of one of the radio network nodes and/or whenever a radio network node or a cell is added to or removed from the network to prevent handover problems for the wireless devices, e.g. incorrect selection of a handover target cell, which might result in loss of connection, in the vicinity of such cells. Since conventional, e.g. macro, radio network nodes operate in an always-on mode and their configuration does not change often, this procedure does not cause unnecessary load on the core network elements and the S1 interface between the radio network nodes and the core network.

The 3GPP standards body has adopted an official architecture and defined standards for home radio network nodes (HeNB, or HNB). A HeNB serves the wireless device in accordance with the 3GPP standards. The HeNB may connect to the core network via a suitable public network, for example via an ADSL link to the Internet, or operator network and in the case of the 3GPP standards, via a so called small cell gateway, e.g. comprising the functionality of a so called HeNB-Gateway (HeNB-GW), which typically aggregates traffic from several HeNBs.

In the TNL Address Discovery procedure, the wireless device reports a cell global identity (CGI) of to the HeNB. The CGI is a concatenation of a global gNB ID, e.g. left most, and a cell ID (CI). The HeNB extracts a global ID, e.g. gNB ID, or gNB-ID, of the neighbor radio network node from a CGI.

In the current 4G, e.g. LTE, a length of the global gNB ID is fixed, and that length is known or configured in all radio network nodes in a RAN. However using a fixed length gNB-ID would be a waste and gNB-ID(s) would not be used in an optimal way. Other solutions would require additional complicated configurations e.g. different ranges of gNB-ID(s) use different lengths.

In conventional solutions, the length of all radio network node IDs such as global gNB IDs is always fixed. The HeNB always extracts the fixed number of left most bits from a CGI to obtain the global gNB IDs.

However in 5G the lengths of the global gNB IDs in a RAN may be different. In 5G the global gNB ID length can be variable between 22 and 32 bits. According to 3GPP specification TS 36.331, the CGI has 36 bits. The variable of the global gNB ID length causes problems since the HeNB does not know to extract how many bit of the CGI to obtain the global gNB ID. It is thus impossible for a HeNB to extract the global gNB ID without knowing the length thereof. The conventional solutions for extracting the fixed length of the CGI will no longer work Therefore, there is a need to at least mitigate or solve this issue.

SUMMARY

A solution is in need to extract the global gNB ID whose length is not fixed from the CGI.

An object of the present disclosure is to provide a mechanism for improving performance of the wireless communication network in an efficient manner.

According to an aspect the object is achieved by providing a method performed by a wireless device for facilitating a first radio network node which is serving the wireless device, to determine a global ID of a second radio network node which is a neighbour of the first radio network node. The method comprises one or more of: receiving length information which specifies a length of the global ID of the second radio network node, from the second radio network node; and sending the received length information to the first node network node.

According to still another aspect the object is achieved by providing a method performed by a first radio network node for determining a global identity of a second radio network node which is a neighbour of the first radio network node. The method comprises one or more of: receiving length information which specifies a length of the global ID of the second radio network node, from a wireless device which is served by the first radio network node; and determining the global ID of the second radio network node based on the length information.

According to still another aspect the object is achieved by providing a method performed by a second radio network node for facilitating a first node network node which is serving a wireless device, to determine a global identity of the second radio network node which is a neighbour of the first radio network node. The method comprises: sending length information which specifies a length of the global ID of the second radio network node to the wireless device.

According to yet another aspect the object is achieved by providing a wireless device for facilitating a first radio network node which is serving the wireless device, to determine a global identity of a second radio network node which is a neighbour of the first radio network node. The wireless device is configured to one or more of: receive length information which specifies a length of the global ID of the second radio network node, from the second radio network node; and send the received length information to the first node network node.

According to yet another aspect the object is achieved by providing a first radio network node for determining a global identity of a second radio network node which is a neighbour of the first radio network node. The first radio network node is configured to one or more of: receive length information which specifies a length of the global ID of the second radio network node, from a wireless device which is served by the first radio network node; and determine the global ID of the second radio network node based on the length information.

According to still another aspect the object is achieved by providing a second radio network node for facilitating a first node network node which is serving a wireless device, to determine a global identity of the second radio network node which is a neighbour of the first radio network node. The second radio network node is configured to: send length information which specifies a length of the global ID of the second radio network node to the wireless device.

It is furthermore provided herein a computer program product comprising instructions, which, when executed on at least one processor, cause the at least one processor to carry out any of the methods above, as performed by the wireless device, the first radio network node or the second radio network node. It is additionally provided herein a computer-readable storage medium, having stored thereon a computer program product comprising instructions which, when executed on at least one processor, cause the at least one processor to carry out the method according to any of the methods above, as performed by the wireless device, the first radio network node or the second radio network node.

By knowing the length information of the global ID, methods of determining the global ID of the second radio network node whose length is not fixed is provided. Therefore the any procedure, e.g. the TNL Address Discovery procedure, based on the global ID is made possible. The methods applicable to any wireless communication system, in which the length of the global ID varies.

The present disclosure affords many advantages, of which a non-exhaustive list of examples follows:

An advantage of the present disclosure is that the methods are fully automatic since they do not require any apart from the current configuration additional configuration on the radio network node. Operators are free to use flexible lengths of global IDs within the wireless communication network without having to configure complicated look-up tables or restrict the global IDs to a fixed length.

The present disclosure not limited to the features and advantages mentioned above. A person skilled in the art will recognize additional features and advantages upon reading the following detailed description.

BRIEF DESCRIPTION OF THE DRAWINGS

The present disclosure will now be described in more detail in relation to the enclosed drawings, in which:

FIG. 7 is a block diagram depicting a first radio network node a;

FIG. 11-FIG. 14 are flowcharts illustrating methods implemented in a communication system comprising a host computer, a base station and a UE.

DETAILED DESCRIPTION

The following description is in the context of 5G, e.g. NR, however the present disclosure is also applied to other wireless communication system, in which the length of the global gNB ID of the radio network node varies.

Figure 1:
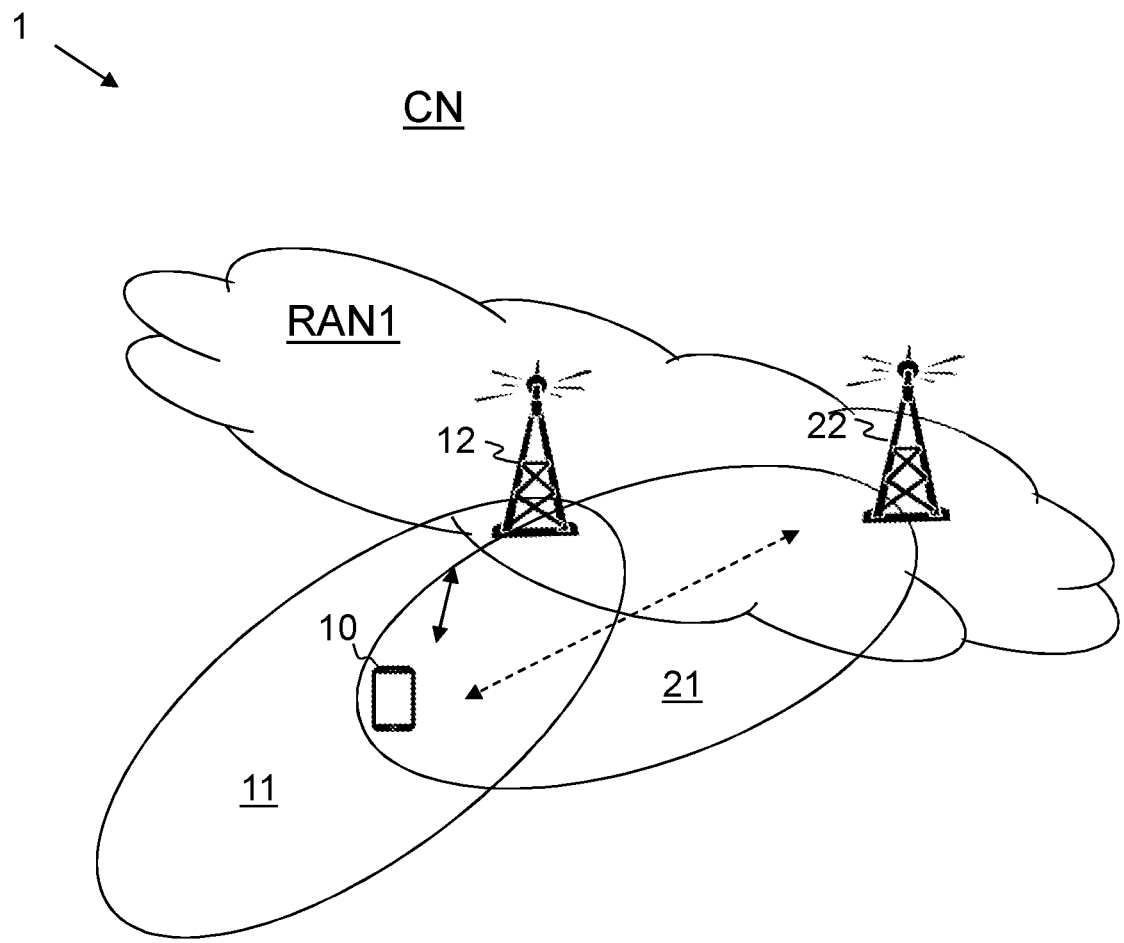
FIG. 1 is a schematic overview depicting a wireless communication network.

The present disclosure relates to wireless communication networks. FIG. 1 is a schematic overview depicting a wireless communication network 1. The wireless communication network 1 comprises one or more RANs e.g. a first RAN (RAN1), connected to one or more CNs. The wireless communication network 1 may use one or more technologies, such as LTE, LTE-Advanced, 5G, WCDMA, GSM/Enhanced Data rate for GSM Evolution (GSM/EDGE), Worldwide Interoperability for Microwave Access (WiMax), or Ultra Mobile Broadband (UMB), just to mention a few possible implementations. In the wireless communication network 1, wireless devices e.g. a wireless device 10 such as a mobile station, a non-access point (non-AP) station (STA), a STA, a UE and/or a wireless terminal, are connected via the one or more RANs, to the one or more CNs. Wireless device is a non-limiting term which means any terminal, wireless communication terminal, user equipment, Machine Type Communication (MTC) device, Device to Device (D2D) terminal, or UE e.g. smart phone, laptop, mobile phone, sensor, relay, mobile tablets or any device communicating within a cell or service area. The wireless device searches for carriers using a carrier raster. The carrier raster indicating possible frequency positions of a carrier for the wireless device The wireless communication network 1 comprises one or more radio network nodes e.g. first radio network node 12 and second radio network node 22. The first and second radio network nodes 12, 22 are exemplified herein as RAN nodes providing radio coverage over a respective geographical area, a first service area 11 and second service area 21 of a radio access technology (RAT), such as NR, LTE, UMTS, Wi-Fi or similar. Each of the first and second radio network nodes 12, 22 may be a radio access network node such as radio network controller or an access point such as a wireless local area network (WLAN) access point or an Access Point Station (AP STA), an access controller, a base station, e.g. a radio base station such as a NodeB, a gNodeB, an eNB, eNodeB, a base transceiver station, Access Point Base Station, base station router, a transmission arrangement of a radio base station, a stand-alone access point or any other network unit capable of serving a wireless device 10 within the service area served by the first or second radio network node 12, 22 depending e.g. on the radio access technology and terminology used and may be denoted as a transmitting and receiving radio network node, respectively. Herein, it is assumed that wireless device 10 currently camps on the first radio network node 12, i.e. the first radio network node is a serving radio network node. The second radio network node 22 is a neighbor of the first radio network node 12 which may be located in the same RAN as the second radio network node 22.

It should be noted that a service area may be denoted as cell, beam, beam group or similar to define an area of radio coverage.

Table 1 shows a cell global ID according to 3GPP TS 38.413 Version 15.1.0. The global gNB ID is comprised in NR cell global ID (NR CGI).

TABLE 1

| IE/Group Name | Presence | Range | IE type and reference | Semantics description |
| --- | --- | --- | --- | --- |
| Public land mobile network (PLMN) Identity | M | | 9.3.3.5 | |
| CHOICE gNB ID | M | | | |
| >gNB ID | | | | |
| >>gNB ID | M | | BIT STRING (SIZE(22 . . . 32)) | Equal to the leftmost bits of the NR Cell Identity IE contained in the NR CGI IE of each cell served by the gNB. |

As it can be understood from Table 1, the gNB ID length can vary between 22 to 32 bits which is equal to the most significant bits of the NR CGI (36 bits) of each cell served by this gNB.

The terms home radio network node (HeNB or HNB), home RAN node and first radio network node 12 are interchangeable. The terms neighbor radio network node, neighbor RAN node and second radio network node 22 whose TNL address is to be discovered by the HeNB, are interchangeable. The terms global ID, gNB ID, gNB-ID, global gNB ID, global radio network node ID, global ID, node ID and global RAN node ID are interchangeable.

The global gNB ID length information is available to the first radio network node 12, so that the first radio network node 12 is enabled to correctly and successfully determine the global gNB ID of the second radio network node 22.

Some procedures based on the global gNB ID is made possible. Take the TNL Address Discovery procedure as an example, the first radio network node 12 is enabled to automatically to add the second radio network node 22 in its neighbor list. A flexible length of the global gNB ID is allowed.

Given the flexible length of global RAN node IDs, an advantage is to have the possibility to assign node IDs in a way that a node ID with a shorter length is comprised in the most significant bits (MSBs) of a node ID with longer length. This allows fully exploit the node/cell ID numbering space available, e.g., if a RAN node cannot fill up its complete cell ID numbering space with cell IDs, another node, with less cell ID numbering space, could use those unused cell ID ranges.

The second radio network node 22 may have one or more global IDs, one per PLMN or per PLMN group to which the second radio network node 22 is associated. If there are two or more global IDs, then they may have different lengths or they may have the same or substantially the same length.

Figure 2:
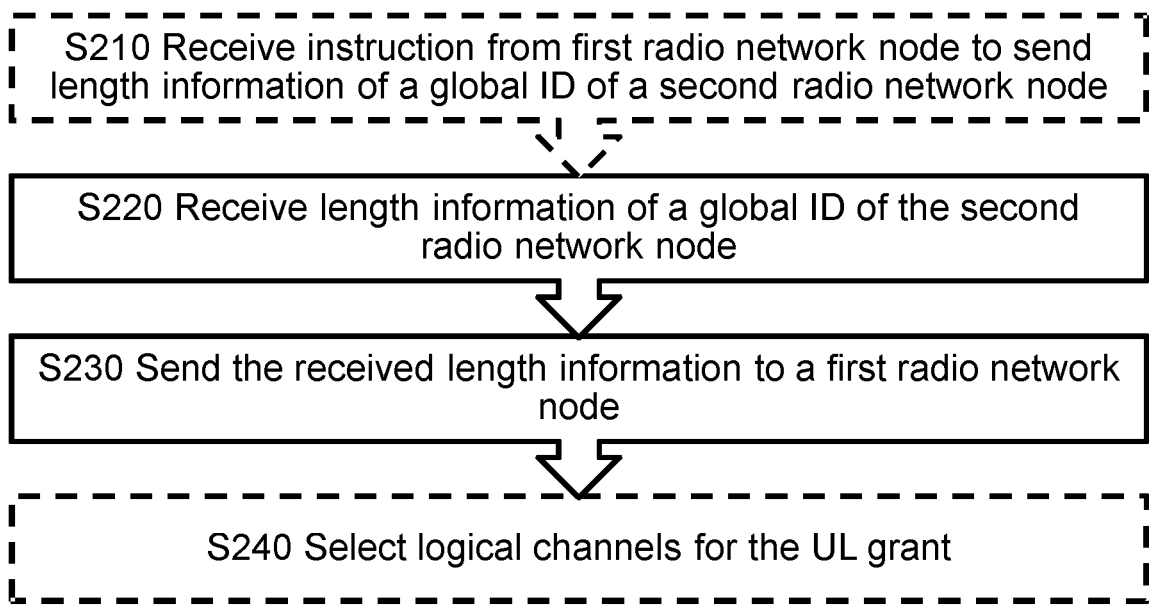
FIG. 2 is a flowchart depicting a method performed by a wireless device.
Figures 4, 5:
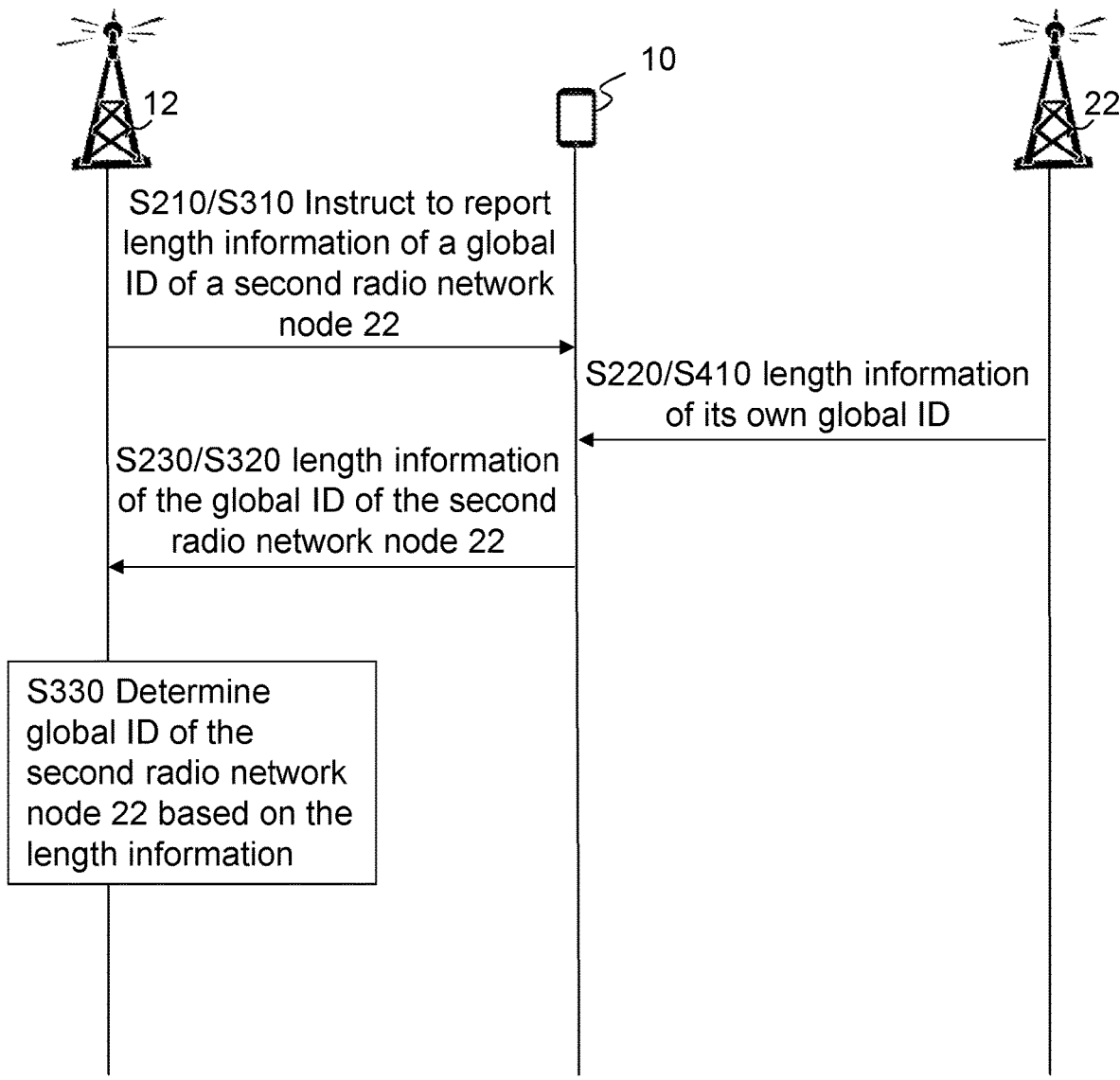
FIG. 4 is a flowchart depicting a method performed by a second radio network node.
FIG. 5 is a combined signalling scheme and flowchart.

The method performed by the wireless device 10 will now be described with reference to a flowchart depicted in FIG. 2, together with FIG. 5 which is a schematic combined signaling scheme and flowchart. The method performed by the wireless device is for facilitating the first radio network node 12 which is serving the wireless device 10, to determine the global ID, such as a global gNB ID, of the second radio network node 22 which is a neighbour of the first radio network node 12 The actions do not have to be taken in the order stated below, but may be taken in any suitable order. Optional actions may be marked with dashed boxes.

Action S210. In order to perform the method, the wireless device 10 may receive an instruction from the first radio network node 12 to send length information The length information specifies a length of the global ID of the second radio network node 22.

The second radio network node 22 may have one or more global IDs, one global ID per PLMN or PLMN group to which the second radio network node 22 is associated. The one or more global IDs may have the same or different lengths. If two or more global IDs have different lengths, then the instruction may indicate that the lengths for each global ID should be sent. If the lengths for two or more global IDs are the same or substantially the same, then this one same length may be sent for all global IDs. The length of the global ID is defined by a number of bits. The length information may specify either: a number of bits exceeding a smallest number of bits that the global ID can have; or a total number of bits of the global ID. Indicating the number of bits exceeding the smallest number of bits the global ID can have additional technical benefit of decreasing the number of bits used by the length information.

As mentioned above, the CGI is composed by the global ID and the cell ID (CI). The length of the CI is variable as is the global ID. Assuming the CGI has 36 bits, and the length of the global ID can be variable between 22 and 32 bits. 22 is the smallest number of bits the global ID can have. If the length of the global ID is 31 bits which are the left most 31 bits of the CGI, then the remaining 1 bit is the cell ID (CI). If the length of the global ID is 31 bits, it means 31−22=9 bits exceeding the smallest number of bits the global ID can have.

The length information may be either an indicator or an index.

The length information may be an indicator directly indicating the total number of bits, e.g. 31 bits. The length information may be an indicator [0, 1, 2 . . . 10] indicating the number of bits exceeding the smallest number. If 9 bits exceeds the smallest number of bits the global ID can have, then the indicator value is 9.

The length information may be an index [index 0, index 1, index 2 . . . index 10] which corresponds to a number of bits of the global gNB ID.

The wireless device 10 may receive the instruction via any message, a none limiting example is a radio resource control (RRC) message. The RRC message may be a rrc-ConnectionReconfiguration message. The length information may be carried in a cellForWhichToReportCGI IE comprised in the RRC message. 3GPP specification TS 38.331-f30 provides more information about the cellForWhichToReportCGI IE.

Action S220. The wireless device 10 receives, e.g. via broadcast, the length information from the second radio network node 22.

The wireless device 10 may receive the length information via any message. As a none limiting example, the message is a system information (SI) message e.g. System Information Block Type1 (SIB1) message. The length information may be carried in e.g., a CellAccessRelatedInfo information element (IE) comprised in the SI message. According to 3GPP TS 36.331 there are 13 different SIBs (SIB1 to SIB13). Each SIB comprises specific information. The System Information message is used to convey one or more System Information Blocks. SIB1 is a special SIB which has a fixed schedule with a periodicity of 80 ms and repetitions made within 80 ms. More technical details about the CellAccessRelatedInfo IE can be found in the 3GPP specification TS 38.3310-f30.

As mentioned above, the length information specifies a length of the global ID of the second radio network node 22, and the length may vary for example between 22 and 32 bits. The second radio network node 22 may have one or more global IDs, and each global ID is associated with a PLMN or a PLMN group. If the radio network node 22 have more than one global IDs, and these global IDs have different lengths, then the length information for each of the different lengths may be received by the wireless device 10.

Action S230. The wireless device 10 sends the received length information to the first node network node 12.

The wireless device 10 may send the received length information to the first node network node 12 via any message, e.g. an automatic neighbour relations (ANR) report carrying the received length information. The ANR report may also be referred to as a reportCGI measurement report. Apart from the CGI, the length information is also carried in the ANR report. An additional IE may be added to the ANR report for the length information. For instance, the received length information may be carried in a CGI IE comprised in the ANR report.

In case the wireless device 10 receives the instruction, the action S230 may be regarded as being in response to the received instruction.

Action S240. The wireless device 10 may select logical channels for the UpLink (UL) grant that satisfy the Link Control Protocol (LCP) mapping restriction.

The LCP mapping restriction comprises at least one of: a transmission reliability requirement, a power control requirement, and information specifying whether a service's LCP is allowed to use the UL grant associated with a different service.

The transmission reliability requirement may specify a maximum block error rate, which is also referred to as Block Error Rate (BLER) target in the disclosure.

Uplink Power Control (UPC) may comprise alpha based power control and closed loop power control. The Closed loop power control is the ability of the wireless device 10 to adjust the uplink transmit power in accordance with the closed-loop correction values, which is also known as transmit power control (TPC) commands.

The power control requirement may specify at least one of: a set of allowed P0-PUSCH-AlphaSet for transmission, a set of allowed PUSCH closed loop index.

The LCP mapping restriction may further specify at least one of:
an allowed Subcarrier Spacing for transmission, a maximum physical uplink shared channel (PUSCH) duration allowed for transmission, information on whether a configured grant Type 1 can be used for transmission, and an allowed cell for transmission.

Figure 3:
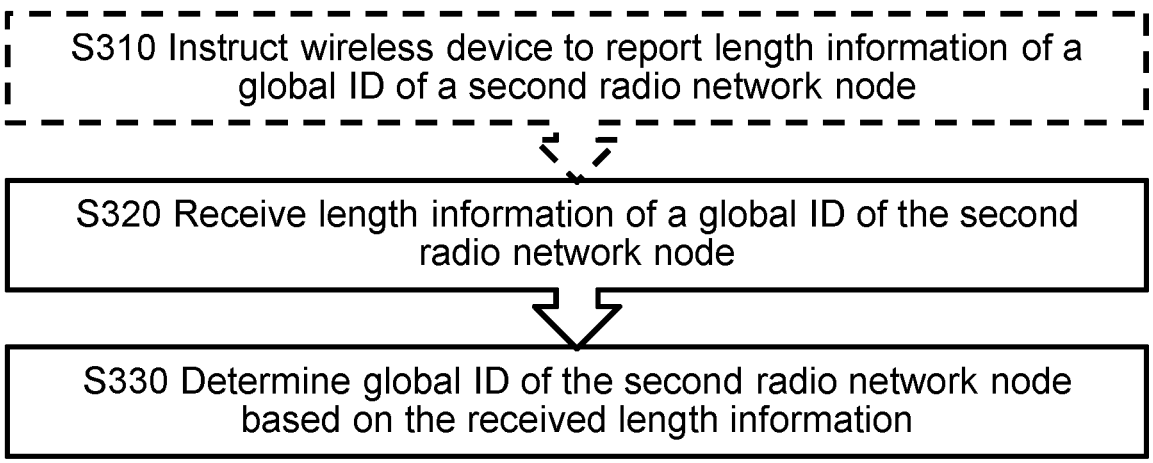
FIG. 3 is a flowchart depicting a method performed by a first radio network node.

The method actions performed by the first radio network node 12 for determining a global ID of a second radio network node 22 which is a neighbour of the first radio network node 12, will now be described with reference to a flowchart depicted in FIG. 3, in together with FIG. 5. The actions do not have to be taken in the order stated below, but may be taken in any suitable order. Optional actions may be marked with dashed boxes.

Action S310. The first radio network node 12 may instruct the wireless device 10 to send the length information to the first radio network node 12.

Action S320. The first radio network node 12 receives the length information which specifies the length of the global ID of the second radio network node 22, from a wireless device 10 which is served by the first radio network node 12.

The second radio network node 22 may have one or more global IDs, one global ID per PLMN or PLMN group to which the second radio network node 22 is associated. The one or more global IDs may have the same or different lengths. If two or more global IDs have different lengths, then the instruction may indicate that the lengths for each global ID should be sent. If the lengths for two or more global IDs are the same or substantially the same, then this one same length may be sent for all global IDs.

Action S330. The first radio network node 12 determines the global ID of the second radio network node 22 based on the length information.

In case the length information specifies a number of bits exceeding a smallest number of bits that the global ID can have, the first radio network node 12 may further sum the number of bits exceeding the smallest number of bits, e.g. 9 bits, and the smallest number of bits can have, e.g. 22 bits, to obtain a total number of bits of the global ID.

In case of the index, the first radio network node 12 may store a mapping table between the index and the number of bits, e.g. the total number of bits, as shown in Table 2 below.

TABLE 2

| Index | Total number of bits |
| --- | --- |
| index 0 | 22 |
| index 1 | 23 |
| ... | |
| index 10 | 32 |

The first radio network node 12 may map the received index to the corresponding total number of bits.

After having total number of bits of the global ID, the first radio network node 12 may determine the global ID by extracting the total number of bits, e.g. the left most total number of bits, from the global ID from the CGI.

The method performed by the second radio network node 22 will now be described with reference to a flowchart depicted in FIG. 4, in together with FIG. 5. The method is for facilitating a first node network node 12 which is serving a wireless device 10, to determine a global ID of the second radio network node 22 which is a neighbour of the first radio network node 12. The actions do not have to be taken in the order stated below, but may be taken in any suitable order.

Action S410. The second radio network node 22 may send, e.g. via broadcast, the length information which specifies the length of the global ID of the second radio network node 22 to the wireless device 10.

By knowing the length information of the global ID, methods of determining the global ID of the second radio network node whose length is not fixed is provided. Therefore the any procedure, e.g. the TNL Address Discovery procedure based on the global ID is made possible. The methods are applicable to any wireless communication system, in which the length of the global ID varies.

The methods herein are fully automatic since they do not require any apart from the current configuration additional configuration on the radio network node. Operators are free to use flexible lengths of global IDs within the wireless communication network without having to configure complicated look-up tables or restrict the global IDs to a fixed length.

Figure 6:
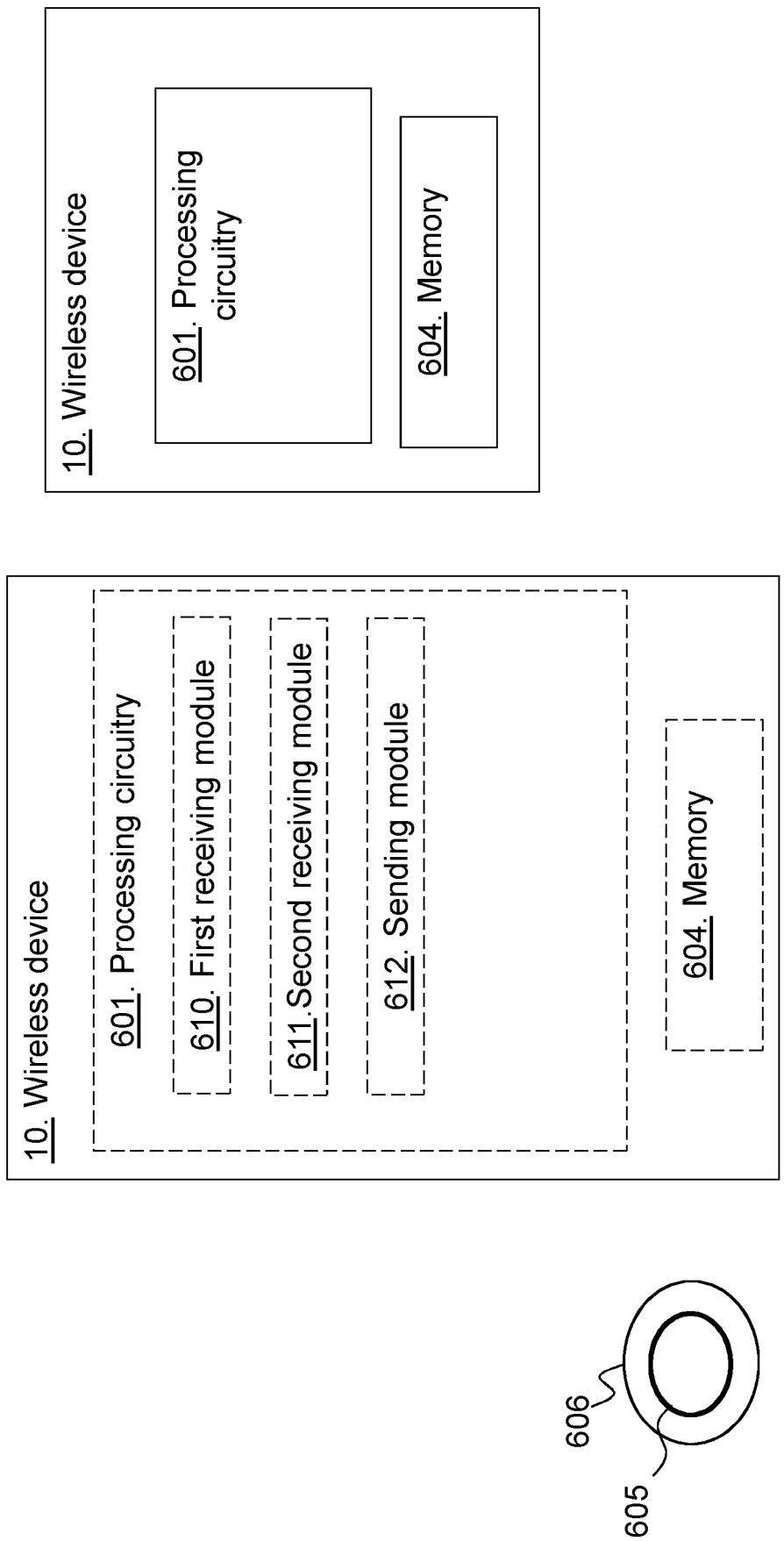
FIG. 6 is a block diagram depicting a wireless device.

FIG. 6 is a block diagram depicting the wireless device 10 for facilitating the first radio radio network node 12 which is serving the wireless device 10, to determine the global ID of the second radio network node 22 which is a neighbour of the first radio network node 12.

The wireless device 10 may comprise processing circuitry 601, e.g. one or more processors, configured to perform the methods herein.

The wireless device 10 may comprise a first receiving module 610, e.g. a receiver or transceiver. The wireless device 10, the processing circuitry 601 and/or the first receiving module 610 may be configured to receive the instruction from the first radio network node 12 to send the length information.

The wireless device 10 comprises a second receiving module 611, e.g. a receiver or transceiver. The wireless device 10, the processing circuitry 601 and/or the second receiving module 611 may be configured to receive the length information which specifies the length of the global ID of the second radio network node 22, from the second radio network node 22.

The wireless device 10 comprises a sending module 612, e.g. a transmitter or transceiver. The wireless device 10, the processing circuitry 601 and/or the sending module 612 may be configured to the send received length information to the first node network node 12.

The wireless device 10 further comprises a memory 604. The memory comprises one or more units to be used to store data on, such as the length information, the global ID, and/or the CGI to perform the methods disclosed herein when being executed, and similar. Thus, the wireless device 10 may comprise the processing circuitry and the memory, said memory comprising instructions executable by said processing circuitry whereby said wireless device 10 is operative to perform the methods herein.

The methods for the wireless device 10 are respectively implemented by means of e.g. a computer program 605 or a computer program product 605, comprising instructions, i.e., software code portions, which, when executed on at least one processor, cause the at least one processor to carry out the actions described herein, as performed by the wireless device 10. The computer program product 605 may be stored on a computer-readable storage medium 606, e.g. a disc, USB or similar. The computer-readable storage medium 606, having stored thereon the computer program product 605, may comprise the instructions which, when executed on at least one processor, cause the at least one processor to carry out the actions described herein, as performed by the wireless device 10 The computer-readable storage medium may be a non-transitory computer-readable storage medium.

Figure 7:
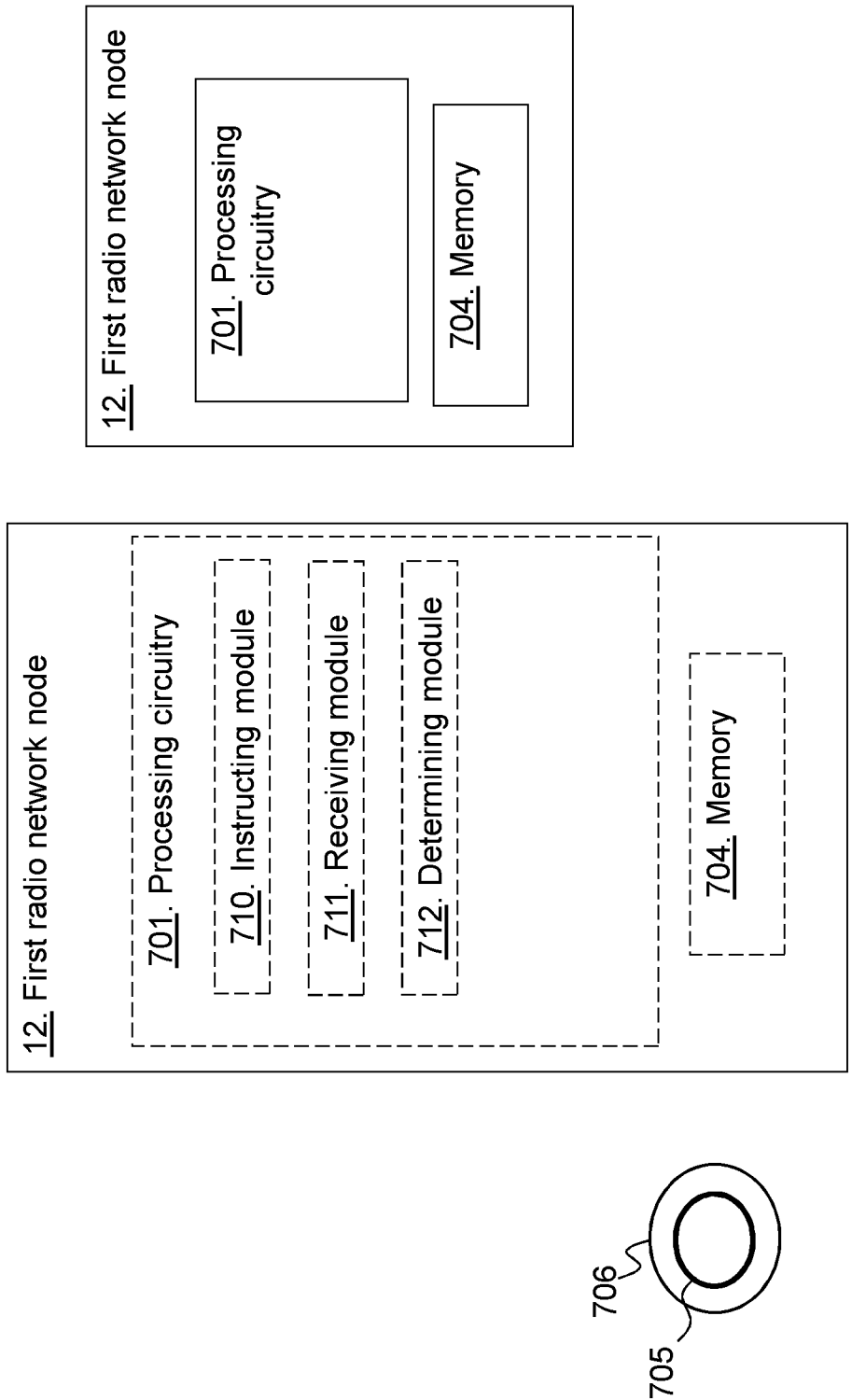

FIG. 7 is a block diagram depicting the first radio network node 12 for determining the global ID of the second radio network node 22 which is a neighbour of the first radio network node 12.

The first radio network node 12 may comprise processing circuitry 701, e.g. one or more processors, configured to perform the methods herein.

The first radio network node 12 may comprise an instructing module 710, e.g. a transmitter or transceiver. The first radio network node 12, the processing circuitry 701 and/or the instructing module 710 may be configured to instruct the wireless device 10 to send the length information to the first radio network node 12.

The first radio network node 12 comprises a receiving module 711, e.g. a receiver or a transceiver. The first radio network node 12, the processing circuitry 701 and/or the receiving module 711 may be configured to receive the length information which specifies the length of the global ID of the second radio network node 22, from the wireless device 10 which is served by the first radio network node 12.

The first radio network node 12 comprises a determining module 712, e.g. a receiver or a transceiver. The first radio network node 12, the processing circuitry 701 and/or the determining module 712 may be configured to determine the global ID of the second radio network node 22 based on the length information.

The first radio network node 12 further comprises a memory 704. The memory 704 comprises one or more units to be used to store data on, such as the length information, the global ID, and/or the CGI to perform the methods disclosed herein when being executed, and similar. Thus, the first radio network node 12 may comprise the processing circuitry and the memory, said memory comprising instructions executable by said processing circuitry whereby said radio network node is operative to perform the methods herein.

The methods for the first radio network node 12 are respectively implemented by means of e.g. a computer program 705 or a computer program product 705, comprising instructions, i.e., software code portions, which, when executed on at least one processor, cause the at least one processor to carry out the actions described herein, as performed by the first radio network node 12. The computer program product 705 may be stored on a computer-readable storage medium 706, e.g. a disc or similar. The computer-readable storage medium 706, having stored thereon the computer program product 705, may comprise the instructions which, when executed on at least one processor, cause the at least one processor to carry out the actions described herein, as performed by the first radio network node 12. The computer-readable storage medium may be a non-transitory computer-readable storage medium.

Figure 8:
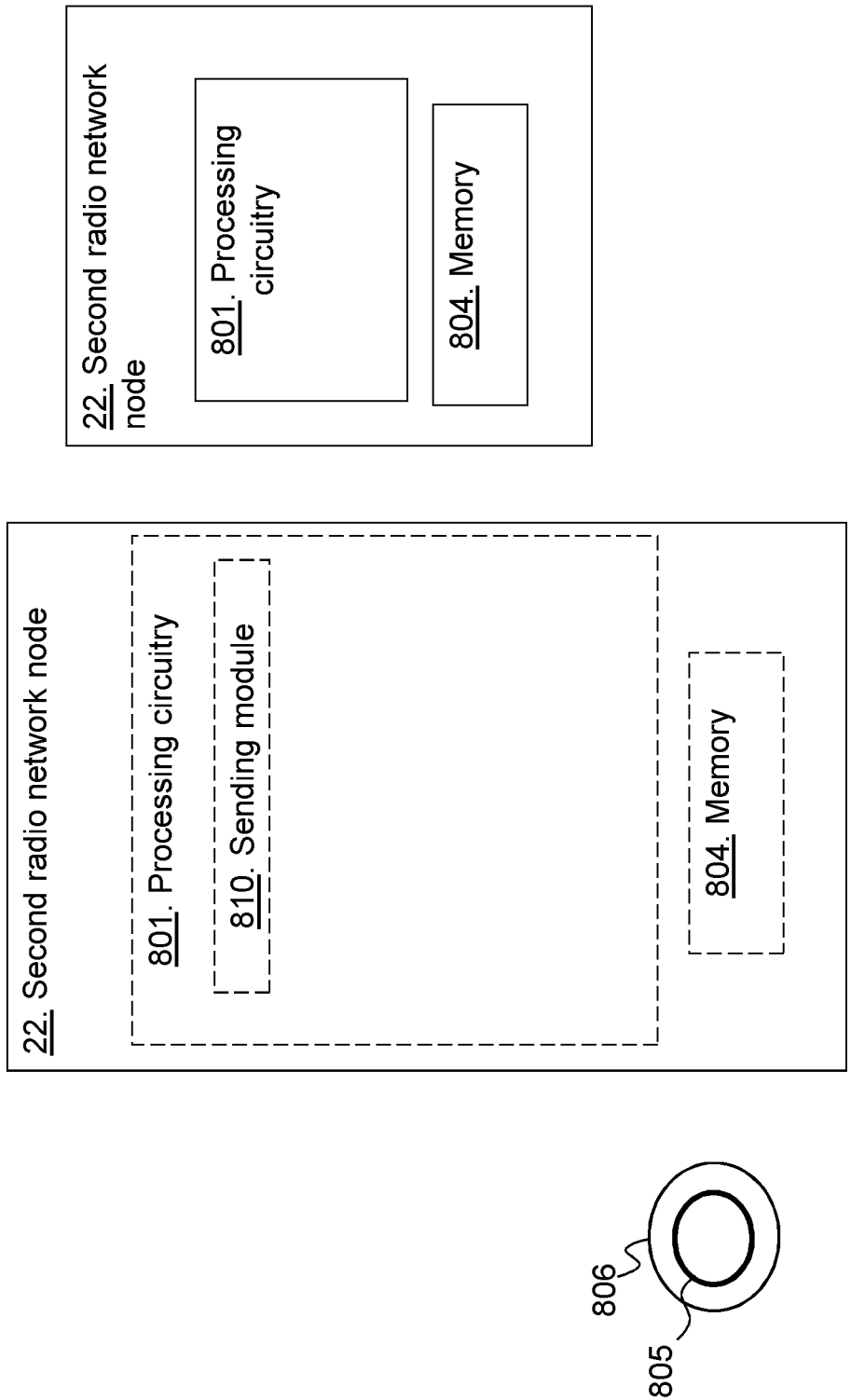
FIG. 8 is a block diagram depicting a second radio network node.

FIG. 8 is a block diagram depicting the second radio network node 22 for facilitating the first node network node 12 which is serving the wireless device 10, to determine the global ID of the second radio network node 22 which is a neighbour of the first radio network node 12.

The second radio network node 22 may comprise processing circuitry 801, e.g. one or more processors, configured to perform the methods herein.

The second radio network node 22 may comprise a sending module 810, e.g. a transmitter or a transceiver. The second radio network node 22, the processing circuitry 801 and/or the transmitting module 810 may further configured to send the length information which specifies the length of the global ID of the second radio network node 22 to the wireless device 10.

The second radio network node 22 further comprises a memory 804. The memory 804 comprises one or more units to be used to store data on, such as the length information, the global ID, and/or the CGI to perform the methods disclosed herein when being executed, and similar. Thus, the second radio network node 22 may comprise the processing circuitry 801 and the memory 804, said memory 804 comprising instructions executable by said processing circuitry 801 whereby said radio network node is operative to perform the methods herein.

The methods for the second radio network node 22 are respectively implemented by means of e.g. a computer program 805 or a computer program product 805, comprising instructions, i.e., software code portions, which, when executed on at least one processor, cause the at least one processor to carry out the actions described herein, as performed by the second radio network node 22. The computer program product 805 may be stored on a computer-readable storage medium 806, e.g. a disc or similar. The computer-readable storage medium 806, having stored thereon the computer program product 805, may comprise the instructions which, when executed on at least one processor, cause the at least one processor to carry out the actions described herein, as performed by the second radio network node 22. The computer-readable storage medium may be a non-transitory computer-readable storage medium.

Functions means or modules may be implemented using digital logic and/or one or more microcontrollers, microprocessors, or other digital hardware. Several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Several of the functional elements of the processing means discussed may be provided through the use of dedicated hardware, while others are provided with hardware for executing software, in association with the appropriate software or firmware. Thus, the term processor or controller as used herein does not exclusively refer to hardware capable of executing software and may implicitly comprise, without limitation, digital signal processor (DSP) hardware, read-only memory (ROM) for storing software, random-access memory for storing software and/or program or application data, and non-volatile memory. Other hardware, conventional and/or custom, may also be comprised. Designers of radio network nodes will appreciate the cost, performance, and maintenance trade-offs inherent in these design choices.

Figure 9:
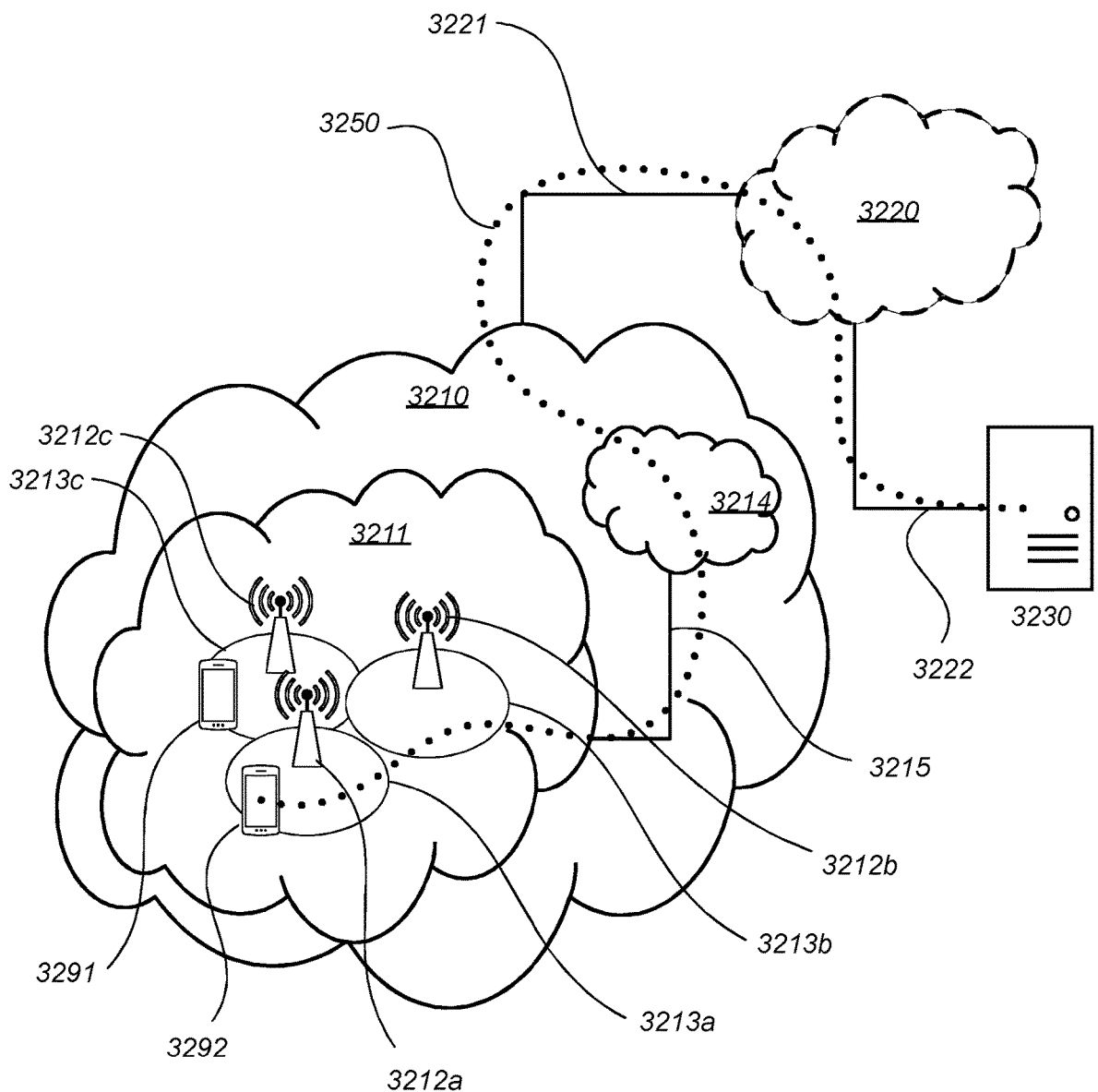
FIG. 9 schematically illustrates a telecommunication network connected via an intermediate network to a host computer.

With reference to FIG. 9, a communication system comprises a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network nodes herein, each defining a corresponding coverage area 3213a, 3213b, 3213c. Each base station 3212a, 3212b, 3212c is connectable to the core network 3214 over a wired or wireless connection 3215. A first UE 3291, being an example of the wireless device 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the present disclosure is equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded, e.g., handed over, to a connected UE 3291. Similarly, the base station 3212 need not be aware of the future routing of an outgoing uplink communication originating from the UE 3291 towards the host computer 3230.

The UE, base station and host computer discussed in the preceding paragraphs will now be described with reference to FIG. 10. In a communication system 3300, a host computer 3310 comprises hardware 3315 comprising a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 comprises a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further comprises a base station 3320 provided in a telecommunication system and comprising hardware 3325 enabling it to communicate with the host computer 3310 and with the UE 3330. The hardware 3325 may comprise a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. The hardware 3325 of the base station 3320 further comprises processing circuitry 3328, which may comprise one or more programmable processors, application-specific integrated circuits, field programmable gate arrays or combinations of these (not shown) adapted to execute instructions. The base station 3320 further comprises software 3321 stored internally or accessible via an external connection.

The communication system 3300 further comprises the UE 3330 already referred to. Its hardware 3335 may comprise a radio interface 3337 configured to set up and maintain a wireless connection 3370 with a base station serving a coverage area in which the UE 3330 is currently located. The hardware 3335 of the UE 3330 further comprises processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 comprises a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
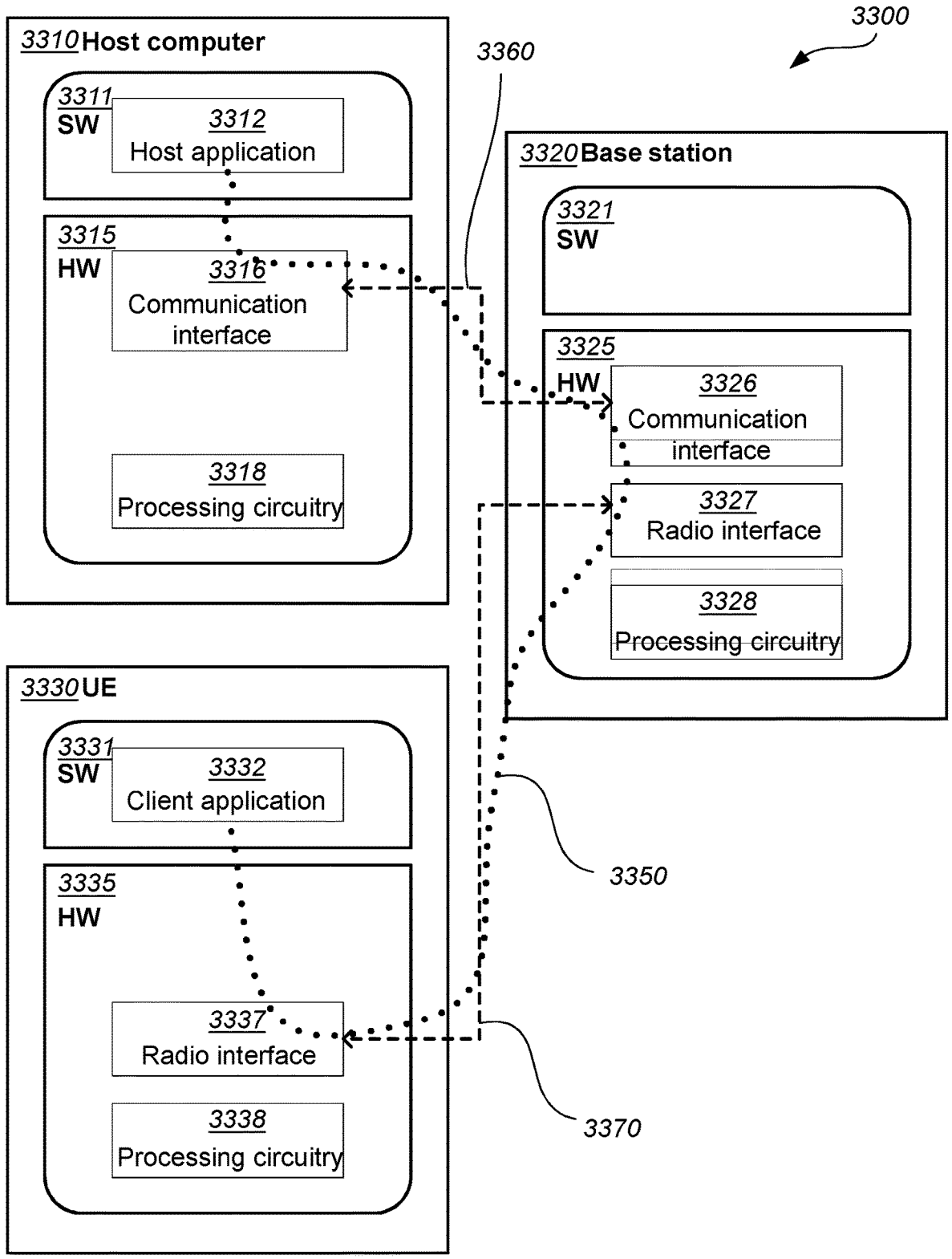
FIG. 10 is a block diagram of a host computer communicating via a base station with a UE over a partially wireless connection.

It is noted that the host computer 3310, base station 3320 and UE 3330 illustrated in FIG. 10 may be identical to the host computer 3230, one of the base stations 3212a, 3212b, 3212c and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the UE 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing, e.g., on the basis of load balancing consideration or reconfiguration of the network.

The performance of OTT services provided to the UE 3330 using the OTT connection 3350 is improved, in which the wireless connection 3370 forms the last segment. More precisely, the determining of the global ID whose length is flexible is improved and thereby provide benefits such as reduced user waiting time, and better responsiveness.

A measurement procedure may be provided for the purpose of monitoring data rate, latency and other factors. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. Sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may comprise message format, retransmission settings, preferred routing etc.; the reconfiguring need not affect the base station 3320, and it may be unknown or imperceptible to the base station 3320. Such procedures and functionalities may be known and practiced in the art. Measurements may involve proprietary UE signaling facilitating the host computer's 3310 measurements of throughput, propagation times, latency and the like. The measurements may be implemented in that the software 3311, 3331 causes messages to be transmitted, in particular empty or dummy messages, using the OTT connection 3350 while it monitors propagation times, errors etc.

FIG. 11 is a flowchart illustrating a method implemented in a communication system. The communication system comprises a host computer, a base station and a UE which may be those described with reference to FIG. 9 and FIG. 10. For simplicity of the present disclosure, only drawing references to FIG. 11 will be comprised in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated. In an optional fourth step 3440, the UE executes a client application associated with the host application executed by the host computer.

FIG. 12 is a flowchart illustrating a method implemented in a communication system. The communication system comprises a host computer, a base station and a UE which may be those described with reference to FIG. 9 and FIG. 10. For simplicity of the present disclosure, only drawing references to FIG. 12 will be comprised in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station. In an optional third step 3530, the UE receives the user data carried in the transmission.

FIG. 13 is a flowchart illustrating a method implemented in a communication system. The communication system comprises a host computer, a base station and a UE which may be those described with reference to FIG. 9 and FIG. 10. For simplicity of the present disclosure, only drawing references to FIG. 13 will be comprised in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE.

FIG. 14 is a flowchart illustrating a method implemented in a communication system. The communication system comprises a host computer, a base station and a UE which may be those described with reference to FIG. 9 and FIG. 10. For simplicity of the present disclosure, only drawing references to FIG. 14 will be comprised in this section. In an optional first step 3710 of the method, the base station receives user data from the UE. In an optional second step 3720, the base station initiates transmission of the received user data to the host computer. In a third step 3730, the host computer receives the user data carried in the transmission initiated by the base station.

A wireless device may comprise processing circuitry configured to one or more of: receive length information which specifies a length of a global ID of a second radio network node, from the second radio network node, wherein the second radio network node is a neighbour of a first radio network node which is serving the wireless device; and send the received length information to the first node network node.

A first radio network node may comprise processing circuitry configured to one or more of: receive length information which specifies a length of a global ID of a second radio network node, from a wireless device which is served by the first radio network node, wherein the second radio network node is a neighbour of the first radio network node; and determine the global ID of the second radio network node based on the length information.

A second radio network node may comprise processing circuitry configured to send length information which specifies a length of a global ID of the second radio network node to a wireless device, wherein the wireless device is served by a first radio network node, the second radio network node is a neighbour of the first radio network node.

Modifications will come to mind to one skilled in the art having the benefit of the teachings presented in the foregoing descriptions and the associated drawings. Therefore, it is to be understood that the present disclosure is not to be limited to what is specifically disclosed and that modifications are intended to be comprised within the scope of this disclosure. Although specific terms may be employed herein, they are used in a generic and descriptive sense only and not for purposes of limitation.

The invention claimed is:

1. A method performed by a first radio network node for determining a global identity (ID) of a second radio network node which is a neighbor of the first radio network node, the method comprising:
   receiving length information which specifies a length of the global ID of the second radio network node, from a wireless device served by the first radio network node; and
   determining the global ID of the second radio network node based on the length information;
   wherein the length of the global ID is defined by a number of bits, the length information specifying a number of bits exceeding a smallest number of bits that the global ID can have, and wherein the determining of the global ID comprises summing the number of bits exceeding the smallest number of bits and the smallest number of bits to obtain a total number of bits of the global ID.

2. The method of claim 1, wherein the receiving of the length information comprises receiving an automatic neighbor relations (ANR) report carrying the length information.

3. The method of claim 1, wherein the determining of the global ID comprises extracting the left most total number of bits of the global ID from a cell global identity (CGI).

4. A method performed by a second radio network node for facilitating a first radio network node serving a wireless device to determine a global identity (ID) of the second radio network node which is a neighbor of the first radio network node, the method comprising:
   sending length information that specifies a length of the global ID of the second radio network node to the wireless device, wherein the length of the global ID is defined by a number of bits, the length information specifying a number of bits exceeding a smallest number of bits that the global ID can have.

5. The method of claim 4, wherein the sending of the length information comprises sending a system information (SI) message carrying the length information.

* * * * *